(12) United States Patent
Whitley et al.

(10) Patent No.: US 7,273,051 B2
(45) Date of Patent: Sep. 25, 2007

(54) DUAL MODE MEDICAL OXYGEN CONCENTRATOR

(75) Inventors: Roger Dean Whitley, Allentown, PA (US); Glenn Paul Wagner, Fogelsville, PA (US); Matthew James LaBuda, Fogelsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 791 days.

(21) Appl. No.: 10/762,785

(22) Filed: Jan. 22, 2004

(65) Prior Publication Data

US 2005/0160905 A1 Jul. 28, 2005

(51) Int. Cl.
*A62B 7/00* (2006.01)
*A62B 9/00* (2006.01)
*G05B 1/00* (2006.01)
*B01D 53/02* (2006.01)
*B01D 59/26* (2006.01)

(52) U.S. Cl. .................. 128/205.11; 95/96; 95/130; 95/148; 96/121; 96/130; 96/143

(58) Field of Classification Search ........... 128/200.11, 128/200.24, 204.18, 204.21–204.25, 205.11, 128/205.12; 96/121, 122, 130, 133, 143; 95/90, 96, 130, 148
See application file for complete search history.

(56) References Cited

U.S. PATENT DOCUMENTS

| | | | |
|---|---|---|---|
| 4,826,510 A | 5/1989 | McCombs | |
| 5,071,453 A * | 12/1991 | Hradek et al. | 96/111 |
| 5,354,361 A | 10/1994 | Coffield et al. | |
| 5,893,944 A * | 4/1999 | Dong | 96/114 |
| 6,033,457 A * | 3/2000 | Lawless | 95/4 |
| 6,095,138 A * | 8/2000 | Hognelid et al. | 128/204.18 |
| 6,478,857 B2 | 11/2002 | Czabala | |
| 6,520,176 B1 | 2/2003 | Dubois | |
| 6,547,851 B2 | 4/2003 | Warren | |
| 6,551,384 B1 | 4/2003 | Ackley et al. | |
| 2002/0096174 A1* | 7/2002 | Hill et al. | 128/205.11 |
| 2003/0005928 A1 | 1/2003 | Appel et al. | |

FOREIGN PATENT DOCUMENTS

| | | |
|---|---|---|
| EP | 1 157 731 A | 11/2001 |
| WO | WO 02/11861 A | 2/2002 |

OTHER PUBLICATIONS

U.S. Appl. No. 10/295,144, filed Nov. 15, 2002, Wagner.

* cited by examiner

*Primary Examiner*—Justine R. Yu
*Assistant Examiner*—Kristen Matter
(74) *Attorney, Agent, or Firm*—John Fernbacher (57) ABSTRACT

Oxygen generation system having a portable oxygen generator unit including a portable air separation device for the generation of an oxygen-rich gas, a primary gas pump including means to supply air to the portable air separation device, a primary motor to drive the gas pump, a rechargeable power supply to drive the motor, connector means adapted to deliver power to the rechargeable power supply, flow coupling means to transfer the oxygen-rich gas from the portable oxygen generator unit, and a first oxygen-rich gas product discharge port. The system also includes a stationary base unit adapted to couple with the portable oxygen generator unit, wherein the stationary base unit has a stationary power supply system including connector means adapted to recharge the rechargeable power supply in the portable oxygen generator unit, flow coupling means to receive the oxygen-rich gas from the portable oxygen generator unit, and an optional second oxygen-rich gas product discharge port.

49 Claims, 3 Drawing Sheets

DUAL MODE MEDICAL OXYGEN CONCENTRATOR

BACKGROUND OF THE INVENTION

The supply of therapeutic oxygen to patients in homes and other residential settings is an important and growing segment of the health care industry. Oxygen can be supplied to a patient by liquid or compressed oxygen with an appropriate vaporization or pressure regulation system and a gas delivery cannula. Alternatively, oxygen can be supplied by the generation of oxygen using a small on site air separation device located near the patient which delivers the generated oxygen via a cannula. This latter mode of oxygen supply is preferred by many patients and numerous small air separation devices have been developed in response to this demonstrated need.

Respiratory oxygen usage rates typically range up to 3 LPM (liters per minute at 22° C. and 1 atma pressure) for ambulatory patients with relatively low oxygen requirements, up to 5 LPM for patients with more serious respiratory problems and possibly limited mobility, and in certain cases up to 10 LPM for those with the most serious respiratory problems and more limited mobility. A patient initially may require a higher oxygen supply rate during an illness and later may require less oxygen as recovery is achieved. Alternatively, a patient may require increasing oxygen rates as a chronic condition worsens. Patient oxygen requirements thus are highly variable, and the maximum oxygen requirement may be three to five times the minimum oxygen requirement.

Residential or home oxygen generation systems therefore must be designed for a wide range of oxygen production rates in order to meet these diverse patient requirements. A provider of home oxygen generators typically will prefer to limit the number of different systems offered for sale while still meeting patient requirements. The economic design of small oxygen generation systems with high turndown ratios is difficult, and it may be necessary for a provider to offer several sizes of generators to meet patient needs. It is desirable for economic reasons to minimize the number of oxygen generation system offerings and to maximize the turndown ratio of each system offered. In addition, it is desirable to meet both ambulatory and non-ambulatory oxygen requirements with a single generator system when possible.

BRIEF SUMMARY OF THE INVENTION

The present invention addresses these needs by means of a dual-mode oxygen generation system comprising a portable oxygen generator unit and a stationary base unit adapted to couple with the portable oxygen generator unit. The portable unit independently generates oxygen in a lower range of flow rates, and the portable and base units when coupled together generate oxygen in a higher range of flow rates. The portable unit is designed to minimize weight and volume, thereby enabling an ambulatory patient to carry the unit easily.

A first embodiment of the invention relates to an oxygen generation system comprising a portable oxygen generator unit having a portable air separation device for the generation of an oxygen-rich gas, a primary gas pump including means to supply air to the portable air separation device, a primary motor to drive the gas pump, a rechargeable power supply to drive the motor, connector means adapted to deliver power to the rechargeable power supply, flow coupling means to transfer the oxygen-rich gas from the portable oxygen generator unit, and a first oxygen-rich gas product discharge port. The system also includes a stationary base unit adapted to couple with the portable oxygen generator unit, wherein the stationary base unit comprises a stationary power supply system including connector means adapted to recharge the rechargeable power supply in the portable oxygen generator unit, flow coupling means to receive the oxygen-rich gas from the portable oxygen generator unit, and a second oxygen-rich gas product discharge port. The portable air separation device may comprise a pressure swing adsorption system.

The portable oxygen generator unit may be capable of operating independently in an uncoupled mode and supplying the oxygen-rich gas product at a first flow rate to a user via a cannula attached to the first discharge port. The portable oxygen generator unit and the stationary base unit may be capable of operating in tandem in a coupled mode and supplying the oxygen-rich gas product at a second flow rate to a user via a cannula attached to the second discharge port, and wherein the second flow rate is greater than the first flow rate.

The primary gas pump may further include means to withdraw gas from the portable air separation device. The primary gas pump also may include include a feed gas compressor and a waste gas compressor, both of which are driven by the primary motor.

In one embodiment, the stationary base unit may include a booster motor and a first drive coupling means integrated with the booster motor, the portable oxygen generator unit may include a second drive coupling means integrated with the primary motor, and the booster motor and primary motor may be adapted to operate in tandem and drive the primary gas pump when the stationary base unit is coupled with the portable oxygen generator unit. The portable air separation device may be sized to generate 0.5 to 5 LPM of oxygen-rich gas, the primary gas pump may be sized to provide sufficient air for the portable air separation device to generate 0.5 to 5 LPM of oxygen-rich gas, the primary motor may be sized to drive the primary gas pump to provide sufficient air to the portable air separation device to generate 0.5 to 3 LPM of oxygen-rich gas, and the booster motor may be sized so that together with the primary motor, the booster motor is able to drive the primary gas pump to provide sufficient air to the portable air separation device to generate 3 to 5 LPM of oxygen-rich gas. The primary gas pump may include means to withdraw gas from the portable air separation device.

In another embodiment, the stationary base unit may include a stationary drive motor and a first drive coupling means integrated with the stationary drive motor, the portable oxygen generator unit may include a second drive coupling means integrated with the primary gas pump, and the stationary drive motor may be adapted to drive the primary gas pump when the stationary base unit is coupled with the portable oxygen generator unit. The portable air separation device may be sized to generate 0.5 to 5 LPM of oxygen-rich gas, the primary gas pump may be sized to provide sufficient air for the portable air separation device to generate 0.5 to 5 LPM of oxygen-rich gas, the primary motor may be sized to drive the primary gas pump to provide sufficient air to the portable air separation device to generate 0.5 to 3 LPM of oxygen-rich gas, and the stationary drive motor may be sized to drive the primary gas pump to provide sufficient air to the portable air separation device to generate 0.5 to 5 LPM of oxygen-rich gas. The primary gas pump may include means to withdraw gas from the portable air separation device.

In yet another embodiment, the stationary base unit may include a secondary gas pump, a stationary drive motor to drive the secondary gas pump, and a gas export line from the secondary gas pump, wherein the portable oxygen generator unit may include a gas import line in flow communication with the portable air separation device; and wherein the gas export line and gas import line each may have flow coupling means that can be coupled such that the secondary gas pump can provide a portion of the air to the portable air separation device when the stationary base unit is coupled with the portable oxygen generator unit. The portable air separation device may be sized to generate 0.5 to 5 LPM of oxygen-rich gas, the primary gas pump may be sized to provide sufficient air for the portable air separation device to generate 0.5 to 3 LPM of oxygen-rich gas, the primary motor may be sized to drive the primary gas pump to provide sufficient air to the portable air separation device to generate 0.5 to 3 LPM of oxygen-rich gas, the secondary gas pump may be sized so that in tandem with the primary gas pump the two pumps can provide sufficient air to the portable air separation device to generate up to 5 LPM of oxygen-rich gas, and the stationary drive motor may be sized to drive the secondary gas pump so that in tandem with the primary gas pump the two pumps can provide sufficient air to the portable air separation device to generate up to 5 LPM of oxygen-rich gas. The primary gas pump may include means to withdraw gas from the portable air separation device and the secondary gas pump may include means to withdraw gas from the portable air separation device.

In still another embodiment, the stationary base unit may include a secondary gas pump, a stationary drive motor to drive the secondary gas pump, and a gas export line from the secondary gas pump, wherein the portable oxygen generator unit may include a gas import line in flow communication with the portable air separation device, and wherein the gas export line and gas import line each may have flow coupling means that can be coupled such that the secondary gas pump can provide all of the air to the portable air separation device when the stationary base unit is coupled with the portable oxygen generator unit. The portable air separation device may be sized to generate 0.5 to 5 LPM of oxygen-rich gas, the primary gas pump may be sized to provide sufficient air for the portable air separation device to generate 0.5 to 3 LPM of oxygen-rich gas, the primary motor may be sized to drive the primary gas pump to provide sufficient air to the portable air separation device to generate 0.5 to 3 LPM of oxygen-rich gas, the secondary gas pump may be sized to provide sufficient air to the portable air separation device to generate 0.5 to 5 LPM of oxygen-rich gas, and the stationary drive motor may be sized to drive the secondary gas pump to provide sufficient air to the portable air separation device to generate 0.5 to 5 LPM of oxygen-rich gas. The primary gas pump may include means to withdraw gas from the portable air separation device and the secondary gas pump may include means to withdraw gas from the portable air separation device.

In another embodiment, the stationary base unit may include a stationary air separation device for the generation of a supplemental oxygen-enriched gas, a stationary gas pump including means to supply air to the stationary air separation device, a motor to drive the stationary gas pump, and piping means to combine the supplemental oxygen-rich gas with the oxygen-rich gas from the portable oxygen generator unit when the stationary base unit is coupled with the portable oxygen generator unit. The portable air separation device may be sized to generate 0.5 to 3 LPM of oxygen-rich gas, the primary gas pump may be sized to provide sufficient air for the portable air separation device to generate 0.5 to 3 LPM of oxygen-rich gas, the primary motor may be sized to drive the primary gas pump to provide sufficient air to the portable air separation device to generate 0.5 to 3 LPM of oxygen-rich gas, the secondary gas pump may be sized to provide sufficient air to the stationary air separation device to generate 0 to 7 LPM of oxygen-rich gas, and the stationary drive motor may be sized to drive the secondary gas pump to provide sufficient air to the stationary air separation device to generate 0 to 7 LPM of oxygen-rich gas. The primary gas pump may include means to withdraw gas from the portable air separation device and the secondary gas pump may include means to withdraw gas from the stationary air separation device. The stationary air separation device may comprise a pressure swing adsorption system.

The portable oxygen generator unit may further comprise a product storage tank for the oxygen-rich gas product. The portable oxygen generator unit may further comprise a conserver adapted to regulate the flow of oxygen-rich gas product supplied to the user by the cannula attached to the first discharge port. The stationary base unit may further comprise a conserver adapted to regulate the flow of oxygen-rich gas product supplied to the user by the cannula attached to the second discharge port.

The stationary base unit may further comprise a humidifier adapted to add moisture to the oxygen-rich gas product. The stationary base unit may further comprise a spare rechargeable power supply and means to recharge the spare rechargeable power supply.

The rechargeable power supply may be a rechargeable battery. The stationary power supply system may comprise an AC to DC power converter and a DC battery charger adapted to recharge the rechargeable battery. The portable air separation device may further comprise a power connector to receive DC power from an external source. Alternatively, the rechargeable power supply may be a portable fuel cell system comprising a fuel cell and portable fuel storage means. The fuel may be hydrogen or methanol.

The stationary power supply system may comprise a stationary fuel cell system, stationary fuel storage means, and piping and connector means to transfer fuel to the portable fuel storage means when the stationary base unit is coupled with the portable oxygen generator unit. The fuel may be hydrogen or methanol.

Another embodiment of the invention relates to a method to generate an oxygen-rich gas product comprising
  (a) providing a portable oxygen generator unit comprising a portable air separation device for the generation of an oxygen-rich gas, a primary gas pump including means to supply air to the portable air separation device, a primary motor to drive the gas pump, a rechargeable power supply to drive the motor, connector means adapted to receive power to recharge the rechargeable power supply in the portable oxygen generator unit, flow coupling means to transfer the oxygen-rich gas from the portable oxygen generator unit, and a first oxygen-rich gas product discharge port;
  (b) providing a stationary base unit adapted to couple with the portable oxygen generator unit, wherein the stationary base unit comprises a stationary power supply system including connector means adapted to supply power to recharge the rechargeable power supply in the portable oxygen generator unit, flow coupling means to receive oxygen-rich gas from the portable oxygen generator unit, and a second oxygen-rich gas product discharge port;

(c) operating the portable oxygen generator unit and the stationary base unit in an uncoupled mode wherein the portable oxygen generator unit is operated to separate air and provide the oxygen-rich gas product at a first flow rate to a user via a cannula attached to the first discharge port; and (d) operating the portable oxygen generator unit and the stationary base unit in a coupled mode by
  (1) coupling the portable oxygen generator unit and the stationary base unit by connecting the connector means and coupling the flow coupling means; and
  (2) operating the portable oxygen generator unit to separate air and provide the oxygen-rich gas, transferring the oxygen-rich gas to the stationary base unit, and supplying the oxygen-rich gas product at a second flow rate to a user via a cannula attached to the second discharge port, and wherein the second flow rate is greater than the first flow rate.

The portable oxygen generator unit may be operated in the uncoupled mode to generate the oxygen-rich gas product at a flow rate in the range of 0.5 to 3 LPM. The portable oxygen generator unit and the stationary base unit may be operated in the coupled mode and the coupled system may generate the oxygen-rich gas product at a flow rate in the range of 0.5 to 5 LPM.

In another embodiment, the stationary base unit may include a booster motor and a first drive coupling means integrated with the booster motor, the portable oxygen generator unit may include a second drive coupling means integrated with the primary motor, and the booster motor and primary motor may be adapted to operate in tandem and drive the primary gas pump when the stationary base unit is coupled with the portable oxygen generator unit. The stationary base unit may be coupled with the portable oxygen generator unit and the booster motor and primary motor may be operated in tandem to drive the primary gas pump and provide air to the portable air separation device.

In yet another embodiment, the stationary base unit may include a stationary drive motor and a first drive coupling means integrated with the stationary drive motor, the portable oxygen generator unit may include a second drive coupling means integrated with the primary gas pump, and the stationary drive motor may be adapted to drive the primary gas pump when the stationary base unit is coupled with the portable oxygen generator unit. The primary gas pump may be driven only by the stationary drive motor to provide the air to the portable air separation device.

In an alternative embodiment, the stationary base unit may include a secondary gas pump, a stationary drive motor to drive the secondary gas pump, and a gas export line from the secondary gas pump, the portable oxygen generator unit may include a gas import line in flow communication with the portable air separation device, and the gas export line and gas import line each may have flow coupling means that can be connected such that the secondary gas pump can provide a portion of the air to the portable air separation device when the stationary base unit is coupled with the portable oxygen generator unit. The stationary base unit may be coupled with the portable oxygen generator unit and the primary and secondary gas pumps may be operated together to provide the air to the portable air separation device.

In another alternative embodiment, the stationary base unit may include a secondary gas pump, a stationary drive motor to drive the secondary gas pump, and a gas export line from the secondary gas pump. The portable oxygen generator unit may include a gas import line in flow communication with the portable air separation device, and the gas export line and gas import line each may have flow coupling means that can be coupled such that the secondary gas pump can provide all of the air to the portable air separation device when the stationary base unit is coupled with the portable oxygen generator unit. The stationary base unit may be coupled with the portable oxygen generator unit and the secondary gas pump may be operated to provide all of the air to the portable air separation device.

The stationary base unit in yet another embodiment may include a stationary air separation device for the generation of a supplemental oxygen-enriched gas, a stationary gas pump including means to supply air to the stationary air separation device, a motor to drive the stationary gas pump, and piping means to combine the supplemental oxygen-rich gas with the oxygen-rich gas from the portable oxygen generator unit when the stationary base unit is coupled with the portable oxygen generator unit. The stationary base unit may be coupled with the portable oxygen generator unit, and the oxygen-enriched gas and the supplemental oxygen-enriched gas are combined to provide the oxygen-rich gas product to the second cannula.

The oxygen-rich product gas may contain greater than 85 mole % oxygen. The primary motor may be driven by externally-provided DC power when the portable oxygen generation unit is operated in the uncoupled mode.

A penultimate embodiment of the invention relates to an oxygen generation system comprising a portable oxygen generator unit including a portable air separation device for the generation of oxygen-rich gas, a primary gas pump including means to supply air to the portable air separation device, a primary motor to drive the gas pump, a rechargeable power supply to drive the motor, connector means adapted to deliver power to the rechargeable power supply, and an oxygen-rich gas product discharge port, wherein the portable oxygen generation unit is adapted to operate in a portable mode and generate a first flow rate of oxygen-rich gas. The system also includes a stationary base unit adapted to couple with the portable oxygen generator unit, wherein the stationary base unit comprises a stationary power supply system including connector means adapted to recharge the rechargeable power supply in the portable oxygen generator unit. The portable oxygen generator unit and the stationary base unit each may include a first flow coupling means adapted to transfer oxygen-rich gas from the portable oxygen generator unit to the stationary base unit and a second flow coupling means adapted to transfer oxygen-rich gas from the stationary base unit to the portable oxygen generator unit, and the stationary base unit and the portable oxygen generator unit may be adapted to operate together in a coupled mode to generate oxygen-rich gas at a second flow rate that is greater than the first flow rate.

The portable oxygen generator unit may be adapted to supply oxygen-rich gas product to a user via a cannula attached to the product discharge port. The stationary base unit may further comprise a humidifier adapted to add moisture to the oxygen-rich gas product. The stationary base unit may be coupled with the portable oxygen generator unit and the stationary base unit and the portable oxygen generator unit may be adapted to provide humidified oxygen-rich product gas to a user via a cannula attached to the product discharge port on the portable oxygen generator unit.

A final embodiment of the invention relates to a method to generate an oxygen-rich gas product comprising
  (a) providing a portable oxygen generator unit comprising a portable air separation device for the generation of oxygen-rich gas, a primary gas pump including means to supply air to the portable air separation device, a primary motor to drive the gas pump, a rechargeable power supply to drive the motor, connector means adapted to receive power to recharge the rechargeable power supply, and an oxygen-rich gas product discharge port;

(b) providing a stationary base unit adapted to couple with the portable oxygen generator unit, wherein the stationary base unit comprises a stationary power supply system including connector means adapted to recharge the rechargeable power supply in the portable oxygen generator unit and means to humidify oxygen-rich gas, and wherein the portable oxygen generator unit and the stationary base unit each include first coupling means adapted to transfer oxygen-rich gas from the portable oxygen generator unit to the stationary base unit and second coupling means adapted to transfer oxygen-rich gas from the stationary base unit to the portable oxygen generator unit;

(c) operating the portable oxygen generator unit and the stationary base unit in an uncoupled mode wherein the portable oxygen generator unit is operated to separate air and provide an oxygen-rich gas product gas at a first flow rate of oxygen-rich gas to a user via a cannula attached to the product discharge port; and (d) operating the portable oxygen generator unit and the stationary base unit in a coupled mode by
 (1) coupling the portable oxygen generator unit and the stationary base unit by connecting the connector means and coupling the first and second coupling means; and
 (2) operating the portable oxygen generator unit to separate air and provide an oxygen-rich gas, transferring the oxygen-rich gas to the stationary) base unit, humidifying the oxygen-rich gas to provide a humidified oxygen-rich gas, transferring the humidified oxygen-rich gas to the portable oxygen generator unit, and supplying a humidified oxygen-rich gas product at a second flow rate of oxygen-rich gas to a user via the cannula attached to the discharge port on the portable oxygen generator unit, wherein the second flow rate is greater than the first flow rate.

BRIEF DESCRIPTION OF SEVERAL VIEWS OF THE DRAWINGS

Embodiments of the invention are illustrated by the following drawings, which are not necessarily to scale.

DETAILED DESCRIPTION OF THE INVENTION

The embodiments of the invention relate to an oxygen generation system comprising a portable oxygen generator unit and a stationary base unit adapted to couple with the portable oxygen generator unit. The portable oxygen generator unit includes a portable air separation device for the generation of an oxygen-rich gas, a primary gas pump including means to supply air to the portable air separation device, a primary motor to drive the gas pump, a rechargeable power supply to drive the motor, connector means adapted to recharge the rechargeable power supply in the portable oxygen generator unit, connector means to transfer the oxygen-rich gas from the portable oxygen generator unit, and a first oxygen-rich gas product discharge port. The stationary base unit is adapted to couple with the portable oxygen generator unit, and the stationary base unit comprises a stationary power supply system including connector means adapted to recharge the rechargeable power supply in the portable oxygen generator unit, flow coupling means to receive the oxygen-rich gas from the portable oxygen generator unit, and optionally a second oxygen-rich gas product discharge port.

Figure 1:
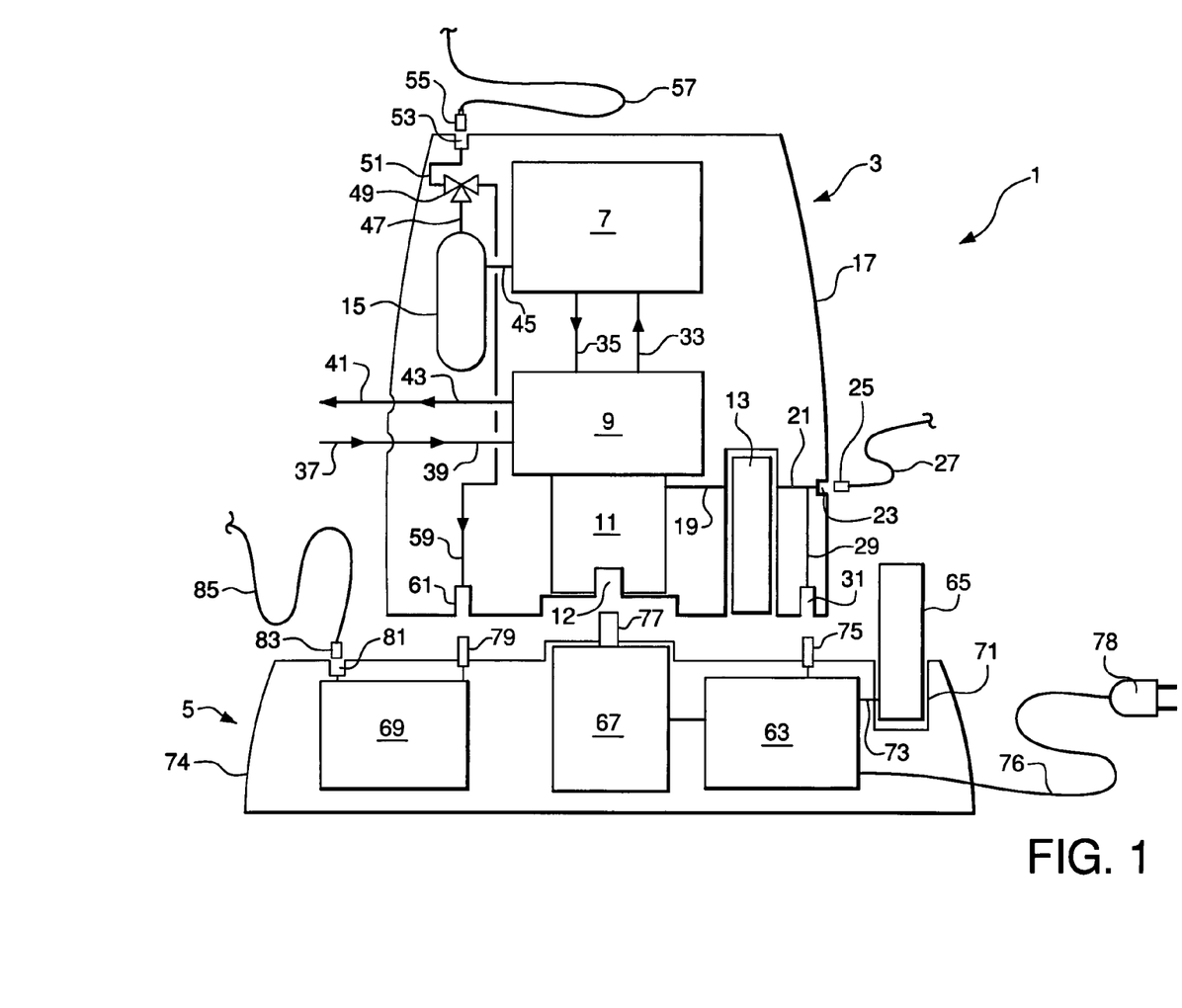
FIG. 1 is a schematic diagram of a first embodiment of the invention.

A first embodiment of the invention is illustrated in FIG. 1. In this exemplary embodiment, oxygen generation system 1 comprises portable oxygen generator unit 3 and stationary base unit 5, shown here in the uncoupled mode. Portable oxygen generator unit 3 includes air separation device 7, gas pump 9, gas pump primary drive motor 11, rechargeable power supply 13, and optional product storage tank 15 to store oxygen-rich gas product. Rechargeable power supply 13 drives motor 11 and provides power to a user display/control panel (not shown). These components are disposed within enclosure or case 17.

Rechargeable power supply 13, which may be a rechargeable battery, provides DC power via conductor 19 to primary drive motor 11. If the battery runs low, DC power to primary drive motor 11 may be provided optionally via conductor 21, which may be connected via connectors 23 and 25 to conductor 27. When externally-supplied DC power is supplied to primary drive motor 11, the battery is recharged if required. Conductor 27 may supply DC power from an outside DC power source (not shown) such as, for example, a DC power outlet in a motor vehicle or any other DC power supply. Alternatively, DC power in conductor 27 may be provided from an optional AC to DC converter (not shown) connected to an external AC power source.

When rechargeable power supply 13 is a battery, it may be recharged by DC power provided via conductor 29 and connector 31 when portable oxygen generator unit 3 is coupled with stationary base unit 5 as described below.

Air separation device 7 may be a pressure swing adsorption (PSA) unit (described below) which receives pressurized feed air via line 33 from gas pump 9 and from which waste gas is withdrawn via line 35 by gas pump 9. Gas pump 9 draws feed air 37 through an inlet port and via line 39 and discharges waste gas 41 from a discharge port connected to line 43. Gas pump 9 typically includes a feed gas compressor taking in atmospheric air and discharging compressed feed air to the PSA system at 1 to 2.5 atma. Gas pump 9 also typically includes a waste gas compressor withdrawing waste gas from the PSA system at pressures above and/or below atmospheric pressure and discharging waste gas at near atmospheric pressure. The feed and waste gas compressors typically are both operated by gas pump primary drive motor 11. The drive motor may be fitted with shaft connector 12 adapted to couple with the shaft of a booster motor as described later.

The feed and waste gas compressors of gas pump 9 may be any type of compressor known in the art and may be selected from scroll, diaphragm, piston, and rotary vane compressors. A scroll compressor is well-suited for service with the air separation devices described herein.

Oxygen-rich gas, defined as a gas containing greater than 80 mole % oxygen, is withdrawn from air separation device 7 via line 45 into optional product storage tank 15. Typically, the oxygen-rich gas contains greater than 90 mole % oxygen. The oxygen-rich gas is withdrawn from product storage tank 15 via line 47 and passes to flow direction valve 49 having an inlet and two outlets. One outlet is connected to line 51 and product discharge port or outlet flow coupling 53, which can be coupled with and uncoupled from flow coupling 55 as described later. Flow coupling 55 is attached to cannula 57 for delivering oxygen-rich product gas to a patient when portable oxygen generator unit 3 is operated in the portable or uncoupled mode. The other outlet of flow direction of valve 49 is connected to line 59 for delivery of the oxygen-rich gas to outlet coupling 61. Valve 49 may be designed and located such that the act of coupling portable oxygen generator unit 3 and stationary base unit 5 directs product gas flow through line 59 and the act of uncoupling directs product gas flow through line 51.

In an alternative embodiment (not shown), flow direction valve 49 may be replaced by two separate valves which may be designed and located such that the act of coupling portable oxygen generator unit 3 and stationary base unit 5 directs product gas flow through line 59 and the act of uncoupling directs product gas flow through line 51. Flow couplings 53 and 55 may be two parts of a quick-connect fitting in which stationary part 53 has an integral mechanically-activated valve that opens when connected with flow coupling 55 and closes when disconnected from flow coupling 55. Likewise, flow couplings 61 and 79 may be two parts of a similar quick-connect fitting. In addition, flow couplings 81 and 83 may be two parts of a similar quick-connect fitting.

In one operating mode of oxygen generation system 1, therefore, oxygen-rich gas product is delivered to the patient via cannula 57 when portable oxygen generator unit 3 operates in the portable mode, i.e., is uncoupled from stationary base unit 5. In the other operating mode, oxygen-rich gas product is delivered to the patient via cannula 85 when portable oxygen generator unit 3 is coupled with stationary base unit 5 and the coupled units are stationary.

Stationary base unit 5 comprises stationary power supply system 63, optional spare rechargeable power supply 65, which may be a rechargeable battery, booster motor 67, and optional product gas humidifier 69. Booster motor may be an AC motor or a DC motor; a DC motor would be used if variable-speed operation is required. Stationary power supply system 63 includes an AC to DC power converter and a DC battery charger adapted, for example, to recharge a rechargeable battery or batteries. This system may be used to recharge rechargeable power supply 13 when portable oxygen generator unit 3 and stationary base unit 5 are coupled. The optional spare rechargeable power supply 65 may be a rechargeable battery and may be held in receptacle 71 and recharged via conductor 73 from stationary power supply system 63. All components in stationary base unit 5 are disposed within enclosure 74. Stationary power supply system 63 is connected to an external AC power supply by conductor 76 and plug 78.

Stationary base unit 5 has several couplings and connectors which can be coupled and connected with corresponding couplings and connectors on portable oxygen generator unit 3. Connector 75 is adapted to connect with connector 31 for recharging rechargeable power supply 13. Shaft coupling 77, which is driven by booster motor 67, can be coupled with shaft connector 12 so that booster motor 67 can be operated in tandem with primary drive motor 11 to provide additional power to operate gas pump 9 at higher capacity. Flow coupling 79 can be coupled with oxygen-rich gas outlet flow coupling 61 to deliver oxygen-rich gas to optional humidifier 69. Oxygen-rich product gas discharge port or flow coupling 81 can be coupled with and uncoupled from flow coupling 83 as described later. Flow coupling 83 is attached to cannula 85 for delivering oxygen-rich product gas to a patient.

Stationary base unit 5 and portable oxygen generator unit 3 can be operated in two modes. In a first mode, stationary base unit 5 and portable oxygen generator unit 3 are uncoupled and portable oxygen generator unit 3 is operated independently to supply oxygen-rich product gas to an ambulatory patient who may carry the portable unit. The portable unit may be powered by rechargeable power supply 13 or alternatively may be powered by external DC power via connectors 23 and 25 and conductor 27. Conductor 27 may supply DC power from an outside DC power source (not shown) such as, for example, a DC power outlet in a motor vehicle or any other DC power supply. Alternatively, DC power in conductor 27 may be provided from an optional AC to DC converter (not shown) connected to an external AC power source. During this mode of operation, stationary base unit 5 is on standby and may be recharging optional spare rechargeable power supply 65.

In the second mode of operation, stationary base unit 5 and portable oxygen generator unit 3 are coupled and operated in tandem to supply oxygen-rich product gas to a non-ambulatory patient located adjacent the coupled unit. In this mode, shaft coupling 77 is coupled with shaft connector 12 so that booster motor 67 operates in tandem with primary drive motor 11 to provide additional power to operate gas pump 9 at higher capacity. Flow coupling 79 is coupled with oxygen-rich gas outlet flow coupling 61 and delivers this gas to optional humidifier 69. Oxygen-rich product gas discharge port or flow coupling 81 is coupled with flow coupling 83 and oxygen-rich product gas is delivered to the patient via cannula 85. While operating in this tandem mode, rechargeable power supply 13 can be recharged by power supply system 63 via connectors 31 and 75, conductor 29, and conductor 21. Spare power supply system 65 also may be recharged via conductor 73.

In an alternative version of this first embodiment, all power to drive gas pump 9 in the coupled mode is supplied by motor 67 via shaft coupling 77 and shaft connector 12. Motor 67 is a larger motor than that used as the booster motor in the initial version of this embodiment described above. Primary drive motor 11 is not operated in this alternative version, and therefore the service life of this motor is increased because the motor is operated only in the portable mode.

Figure 2:
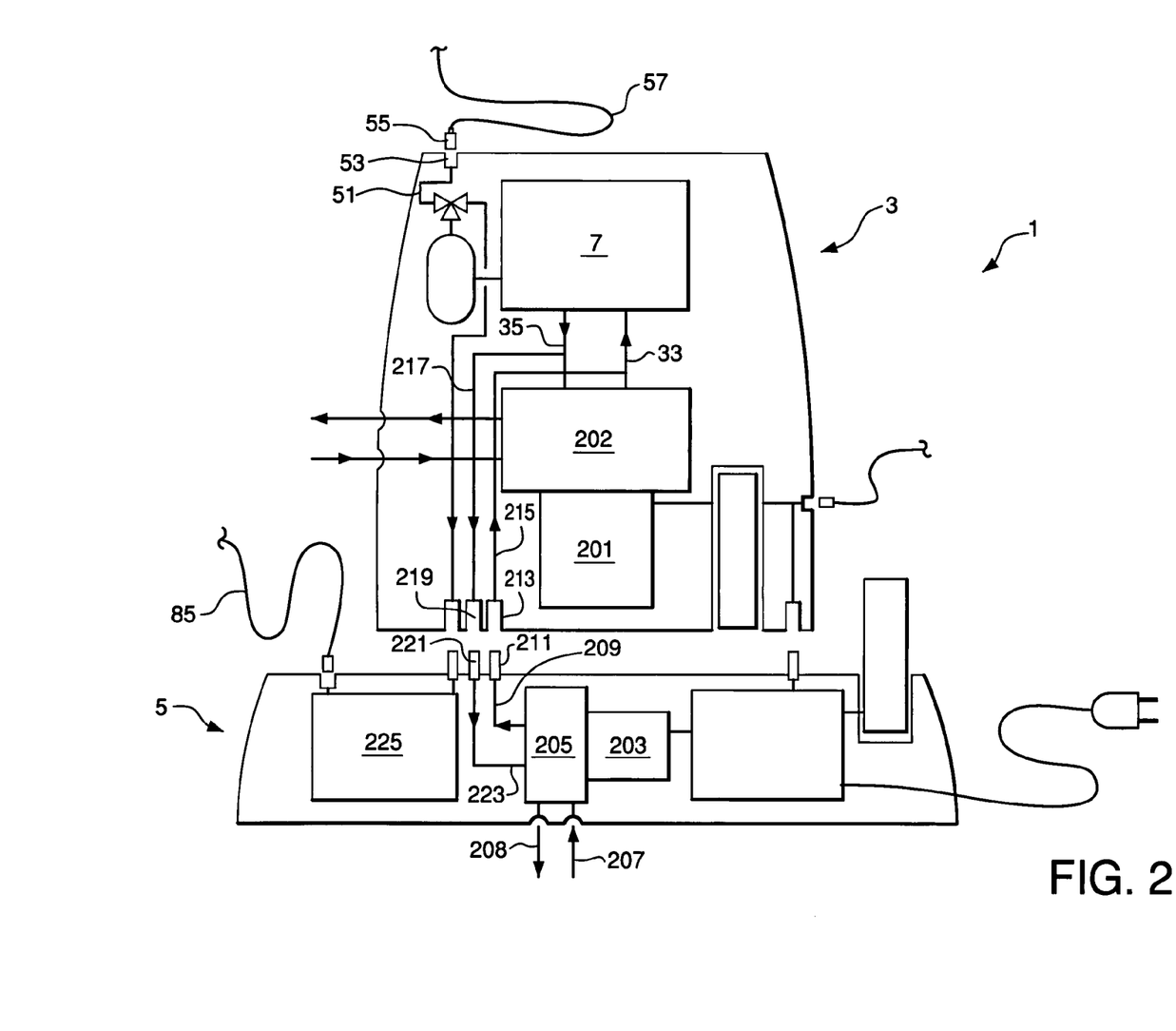
FIG. 2 is a schematic diagram of a second embodiment of the invention.

A second embodiment of the invention is illustrated in FIG. 2. In this exemplary embodiment, oxygen generation system 1 comprises portable oxygen generator unit 3 and stationary base unit 5, shown here in the uncoupled mode. Portable oxygen generator unit 3 and stationary base unit 5 of FIG. 1 are modified in this second embodiment so that supplementary feed air is supplied from the base unit to the portable unit and waste gas is withdrawn from the portable unit to the base unit when the units operate in the tandem or coupled mode. All other features and components typically are identical to those described above with reference to FIG. 1. In this second embodiment, booster motor 67 of FIG. 1 is not used and the primary drive motor of portable unit 3 operates independently at all times.

In FIG. 2, primary drive motor 201 drives gas pump 202 in both the coupled and uncoupled operating modes in a manner similar to that of primary drive motor 11 and gas pump 9 of FIG. 1, except that primary drive motor 201 operates independently and is not coupled to a booster motor. In the coupled mode, drive motor 203 drives supplemental gas pump 205, which draws supplemental feed air 207 through an inlet port and discharges waste gas 208 from a discharge port, wherein the inlet and discharge ports are connected to supplemental gas pump 205. Gas pump 205 typically includes a feed gas blower taking in atmospheric air 207 and discharging supplemental compressed feed air to air separation device 7, which may be a PSA system, at 1 to 4 atma via line 209, flow coupling 211, flow coupling 213, and line 215 joining line 33 to air separation device 7. Gas pump 205 also typically includes a discharge gas blower for withdrawing gas from air separation device 7 at pressures above and/or below atmospheric pressure via line 217, flow coupling 219, flow coupling 221, and line 223, and discharging gas 208 from gas pump 205 at near atmospheric pressure. The withdrawn gas may be PSA system waste gas. The feed blower and discharge gas blower typically are both operated by gas pump drive motor 203.

In this second embodiment, portable oxygen generator unit 3 operates in the uncoupled mode as described for the first embodiment. In the coupled mode, the coupled systems of the second embodiment operate as described for the first embodiment except for the modifications described immediately above. This second embodiment allows a reduction in the size of the gas pump in portable oxygen generator unit 3, wherein gas pump 202 of FIG. 2 is smaller than gas pump 9 of FIG. 1, thereby reducing the weight of portable oxygen generator unit 3.

In an alternative version of this second embodiment, all feed air in the coupled operating mode is supplied to air separation device 7 by gas pump 205 via lines 209 and 215, and all waste gas is withdrawn from air separation device 7 via lines 217 and 223 by gas pump 205. In this alternative version, the capacity of gas pump 205 and output of drive motor 203 are increased over the initial version of the embodiment described above. Primary drive motor 201 and gas pump 202 are not operated in this alternative version, and therefore the service lives of this motor and pump are increased because they are operated only in the portable mode.

Figure 3:
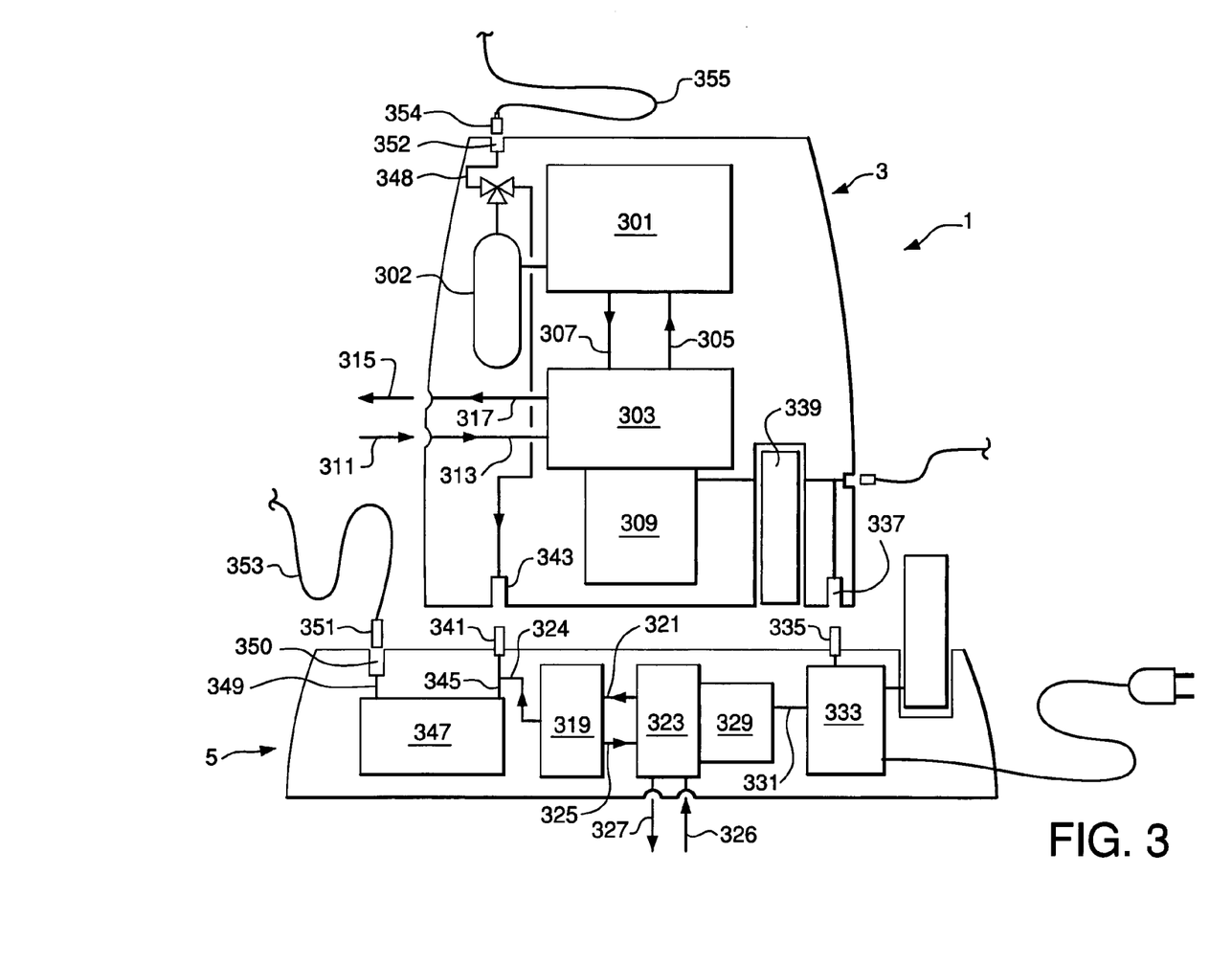
FIG. 3 is a schematic diagram of a third embodiment of the invention.

A third embodiment of the invention is illustrated in FIG. 3. In this exemplary embodiment, oxygen generation system 1 comprises portable oxygen generator unit 3 and stationary base unit 5, shown here in the uncoupled mode. Portable oxygen generator unit 3 and stationary base unit 5 of FIG. 1 are modified in this third embodiment so that the maximum production capacity of the air separation device in the portable unit is reduced and an air separation device is included in the stationary base unit for operation in either or both of the coupled and uncoupled modes. All other features and components typically are identical to those described above with reference to FIG. 1.

In the uncoupled mode of operation in this third embodiment, air separation device 301, for example a PSA system, receives pressurized feed gas from gas pump 303 and gas pump 303 withdraws gas, for example waste gas, from air separation device 301 via lines 305 and 307, respectively. Gas pump 303, which is driven by primary drive motor 309, draws feed air 311 through an inlet port and via line 313 and discharges waste gas 315 from a discharge port connected to line 317. Gas pump 303 typically includes a feed blower taking in atmospheric air and discharging compressed feed air to air separation device 301, which may be a PSA system, at 1 to 2.5 atma. Gas pump 303 also typically includes a discharge gas blower withdrawing gas from air separation device 301. The withdrawn gas may be waste gas withdrawn from a PSA system at pressures above and/or below atmospheric pressure that is discharged at near atmospheric pressure. The feed blower and discharge gas blower typically are both operated by gas pump primary drive motor 309.

In this third embodiment, stationary base unit 5 includes air separation device 319, which may be a pressure swing adsorption (PSA) unit, and the device receives pressurized feed air via line 321 from gas pump 323 and provides oxygen-rich gas via line 324. Discharge gas is withdrawn from air separation device 319 via line 325 by gas pump 323. Gas pump 323 draws feed air 326 through an inlet port and discharges withdrawn gas 327 from a discharge port. Gas pump 323 typically includes a feed blower taking in atmospheric air and discharging compressed feed air, for example to a PSA system, at 1 to 2.5 atma. Gas pump 323 also typically includes a blower withdrawing discharge gas from air separation device 319 at pressures above and/or below atmospheric pressure and discharging this gas at near atmospheric pressure. The withdrawn gas may be PSA system waste gas. The feed blower and waste gas blower typically are both operated by gas pump drive motor 329, which receives power via conductor 331 from power supply system 333. Motor 329 may be an AC or a DC motor; a DC motor would be used if variable speed operation is required.

Stationary base unit 5 includes connector 335 which may be connected with connector 337 in portable oxygen generator unit 3 to recharge rechargeable power supply 339 when portable oxygen generator unit 3 and stationary base unit 5 are coupled together. The base unit also includes flow coupling 341 which is connected with flow coupling 343 in portable oxygen generator unit 3 to allow oxygen-rich gas to flow from air separation device 301 via optional product gas storage tank 302 when portable oxygen generator unit 3 and stationary base unit 5 are coupled together. In this coupled mode, combined oxygen-rich gas from air separation devices 301 and 319 flows via line 345 into humidifier 347. The oxygen-rich product gas flows from humidifier 347 through conduit 349 to flow coupling 350. Flow coupling 350 in stationary base unit 5 and flow coupling 351 are coupled to provide final oxygen-rich product gas to the patient via cannula 353. Optionally, stationary base unit 5 may be operated in the uncoupled mode to provide oxygen-rich product gas at a lower flow rate when portable oxygen generator unit 3 is on standby or is out for servicing.

The third embodiment described above minimizes the weight of portable oxygen generator unit 3 compared with that of the first and second embodiments described earlier because air separation device 301 may be sized to provide the only required amount of oxygen-enriched product gas required from portable oxygen generator unit 3 operating in the uncoupled mode. In contrast, air separation device 7 of the first and second embodiments is sized to provide all or a portion of the oxygen-enriched product gas required from portable oxygen generator unit 3 and stationary base unit 5 when operating in the coupled mode. Thus air separation device 301 of FIG. 3 may be lighter than air separation device 7 of FIGS. 1 and 2.

The type of gas pump 232 the stationary base unit can be different than the type of gas pump 303 of the portable unit used in the portable generator, since low weight, low volume, and power efficiency are less critical for the base unit than for the portable unit. The air separating device and process of the base unit also may be different from that of the portable unit, also since low weight, low volume, and power efficiency are less critical for the base unit than the portable unit.

Alternatives to the three embodiments described above may be envisioned wherein a patient wishes to travel for an extended period, for example in a motor vehicle, and requires a humidified oxygen-rich gas product, possibly at a rate higher than that generated by the portable unit alone. In any of these alternatives, stationary base unit 5 may be fitted with a DC power connection and connected to a DC power outlet in the motor vehicle so that the base unit and portable unit can be operated in the coupled mode. Alternatively, in the third embodiment described above, the base unit alone could be taken by the patient for extended travel in a motor vehicle.

In any of the embodiments described above, the efficiency of oxygen usage by the patient may be increased significantly by using a conserver. This is a well-known device which typically uses an inhalation sensor to measure a parameter, for example pressure, at the cannula inlet. When the patient inhales, a reduced pressure is sensed and relayed to a control unit, which releases product gas from the product tank. When the patient exhales, an increased pressure is sensed and relayed to the control unit, which stops the release of product gas from the product tank. Any of the various types of conservers known in the art may be utilized in conjunction with any embodiment of the present invention. A conserver may be installed in stationary base unit 5 and/or in portable oxygen generator unit 3, and has appropriate piping and controls such that the patient can obtain oxygen-rich product either with or without the use of the conserver.

Oxygen generation system 1 of FIGS. 1, 2, and 3 may include a user interface (not shown) mounted on case 17 of portable oxygen generator unit 3. This interface comprises a control to turn the system on and off and a control to switch between continuous output and conserver mode. The interface may also have various lights to indicate when the unit is on, when the oxygen concentration is low, and other operating conditions or alarms. Audible alarms may also be used for conditions such as low oxygen flow or low battery charge level. A second interface, which may be located behind a panel on case 17 of portable oxygen generator unit 3, may be provided for the service technician or the patient to change the prescribed flow rate of oxygen-rich product based on the patient's doctor's advice. The control to change flow may be mechanical or digital and may have a digital readout of the flow rate setting. This interface may also contain a run time meter.

As mentioned above, any of air separation devices 7, 301, and 319 may be PSA systems wherein PSA operation may include a cycle with adsorption at superatmospheric pressure and desorption at subatmospheric pressure. A typical PSA system for use in this application may include multiple adsorbent beds and may use, for example, five adsorbent beds. An exemplary PSA system with five beds may use, for example, a cycle having process steps including adsorption/make product, first depressurization to provide pressurization gas to another bed, second depressurization to provide pressurization gas to yet another bed, optional idle step, countercurrent evacuation, purge using product gas, first pressurization by gas from another bed undergoing second depressurization, second pressurization by gas from yet another bed undergoing first depressurization, product repressurization, and feed repressurization. A typical cycle time may be 10 seconds.

Control of gas flow to and from the beds may be effected by a pair of rotary valves, one for the feed ends and one for the product ends of the beds. The rotary valves may be operated by a common shaft operated by a single motor. Rotary valves of this type are described, for example, in a copending United States patent application having Ser. No. 10/295,144 filed on Nov. 15, 2002. This patent application is incorporated herein by reference.

The adsorbent beds in this exemplary PSA system may include two layers of adsorbent material wherein a layer of adsorbent for water removal (for example, NaX zeolite or activated alumina) is installed at the inlet end of each bed and a layer of nitrogen-selective adsorbent for air separation (for example, LiX zeolite) is installed between the water removal adsorbent and the bed outlet. The adsorbents may be conventional particles having diameters in the range of 0.25 mm to 1.0 mm to give a balance between fast mass transfer and reasonable pressure drop. Alternatively, the adsorbents may be utilized in the form of monoliths, laminates, or other types of structures known in the art. Typical bed dimensions for the production of 3 LPM of 93 mole % oxygen are a height of 87 mm and a diameter of 53 mm. The minimum cycle pressure may be 0.25 to 0.65 atma and the maximum cycle pressure may be 1.3 to 2.5 atma.

Alternatively, any of air separation devices 7, 301, and 319 may be membrane-based systems utilizing either polymeric membranes operating at near ambient temperatures or mixed metal oxide ion transport membranes operating at elevated temperatures. In view of the present state of the art in membrane-based air separation systems, these systems may be best suited for use in air separation device 319 in stationary base unit 5 of FIG. 3, in which weight and volume are less critical when compared with portable oxygen generator unit 3. A variation of the third embodiment (FIG. 3) may be envisioned, for example, in which air separation device 319 is a mixed metal oxide ion transport membrane system and air separation device 301 is a PSA system.

Any of rechargeable power supplies 13, 65, and 339 may be rechargeable batteries sized for a proper balance between weight and operating life. In this case, stationary power supply systems 63 and 333 (FIGS. 1 and 3) may include an AC to DC power converter and a DC battery charger adapted to recharge the rechargeable battery or batteries when portable oxygen generator unit 3 and stationary base unit 5 are coupled. Batteries and power supply systems for such service are well-known and commercially available.

Alternatively, any of rechargeable power supplies 13, 65, and 339 may be fuel cell systems operating, for example, on hydrogen or methanol. Each fuel cell system would include a fuel cell and means for storing hydrogen or methanol, and would be sized for a proper balance of weight and operating life. In this case, each stationary power supply system in the base unit also may include fuel cell systems operating, for example, on hydrogen or methanol. Each fuel cell system in the base unit would include a fuel cell to generate power to operate the drive motors, may include integrated means for storing hydrogen or methanol, or alternatively may be connected to an external source of fuel. The stationary power supply system would be adapted to supply fuel to rechargeable power supplies 13, 65, and 339 when portable oxygen generator unit 3 and base unit 5 are coupled.

The use of combinations of fuel cells and batteries can be envisioned for operating the dual mode generator. For example, the stationary power supply system in base unit 5 may include an AC power supply to operate drive motors 67, 203, and 329 and portable oxygen generator unit 3 may include a fuel cell system. In this case, the base unit power supply system may include an electrolysis unit to generate hydrogen for recharging the fuel cell system when portable oxygen generator unit 3 and base unit 5 are coupled.

The three embodiments described above may be designed and operated to provide ranges of oxygen-rich gas production rates in the coupled and uncoupled modes of operation. The embodiments also may include optional functions for the design and operation of the stationary base unit. A series of five exemplary embodiments are described below to illustrate the invention, but are not intended to limit the scope of the invention in any way. The five exemplary embodiments are summarized in Table 1.

TABLE 1

Summary of Exemplary Embodiments

| | Portable Unit | | | Stationary Unit | | |
|---|---|---|---|---|---|---|
| Embodiment | Design | Mode | Operation | Design | Mode | Operation |
| 1 (FIG. 1) | Adsorbers (0.5–5 LPM) Pump (0.5–5 LPM) Motor (0.5–3 LPM) | Portable | Adsorbers (0.5–3 LPM) Pump (0.5–3 LPM) Motor (0.5–3 LPM) | Motor (0–2 LPM) | Portable | Note (1) |
| | | Coupled | Adsorbers (0.5–5 LPM) Pump (0.5–5 LPM) Motor (0.5–3 LPM) | | Coupled | Motor (0–2 LPM) linked with Motor (0.5–3 LPM) in portable unit |
| 1A (FIG. 1) | Adsorbers (0.5–5 LPM) Pump (0.5–5 LPM) Motor (0.5–3 LPM) | Portable | Adsorbers (0.5–3 LPM) Pump (0.5–3 LPM) Motor (0.5–3 LPM) | Motor (0.5–5 LPM) | Portable | Note (1) |
| | | Coupled | Adsorbers (0.5–5 LPM) Pump (0.5–5 LPM) | | Coupled | Motor (0.5–5 LPM) provides total drive for Pump (0.5–5 LPM) in portable unit |
| 2 (FIG. 2) | Adsorbers (0.5–5 LPM) Pump (0.5–3 LPM) Motor (0.5–3 LPM) | Portable | Adsorbers (0.5–3 LPM) Pump (0.5–3 LPM) Motor (0.5–3 LPM) | Pump (0–2 LPM) Motor (0–2 LPM) | Portable | Note (1) |
| | | Coupled | Adsorbers (0.5–5 LPM) Pump (0.5–3 LPM) Motor (0.5–3 LPM) | | Coupled | Pump (0–2 LPM) and Motor (0–2 LPM) provides feed air to portable unit |
| 2A (FIG. 2) | Adsorbers (0.5–5 LPM) Pump (0.5–3 LPM) Motor (0.5–3 LPM) | Portable | Adsorbers (0.5–3 LPM) Pump (0.5–3 LPM) Motor (0.5–3 LPM) | Pump (0.5–5 LPM) Motor (0.5–5 LPM) | Portable | Note (1) |
| | | Coupled | Adsorbers (0.5–5 LPM) | | Coupled | Pump (0.5–5 LPM) and Motor (0.5–5 LPM) provide all feed air to portable unit |
| 3 (FIG. 3) | Adsorbers (0.5–3 LPM) Pump (0.5–3 LPM) Motor (0.5–3 LPM) | Portable | Adsorbers (0.5–3 LPM) Pump (0.5–3 LPM) Motor (0.5–3 LPM) | Adsorbers (0–7 LPM) Pump (0–7 LPM) Motor (0–7 LPM) | Portable | Note (1) |
| | | Coupled | Adsorbers (0.5–3 LPM) Pump (0.5–3 LPM) Motor (0.5–3 LPM) | | Coupled | Adsorbers (0–7 LPM), Pump (0–7 LPM), and Motor (0–7 LPM) provide $O_2$ |

Note (1):
During portable unit operation, stationary unit may recharge optional spare portable power supply Exemplary Embodiment 1

This embodiment uses the system of FIG. 1 as described above. In this embodiment, portable air separation device 7 is a PSA system sized to deliver 0.5 to 5 LPM of oxygen-rich gas product with a purity of at least 80 mole % oxygen. Gas pump 9 is designed to provide sufficient pressurized air feed to the PSA system and withdraw sufficient waste gas from the PSA system so that the system can generate the required range of 0.5 to 5 LPM of oxygen-rich gas product. Gas pump primary drive motor 11 is designed to drive gas pump 9 to provide sufficient air to the portable air separation device to generate 0.5 to 3 LPM of oxygen-rich gas. Booster motor 67 in stationary base unit 5 is designed to drive the primary gas pump to provide sufficient air to the portable air separation device to generate 0 to 2 LPM of oxygen-rich gas. Primary drive motor 11 is designed to be coupled with booster motor 67, and the coupled drive motors are designed to provide sufficient air to the portable air separation device to generate 0.5 to 5 LPM of oxygen-rich gas.

In uncoupled or portable operation, portable air separation device 7 is carried by the patient and operates on power from rechargeable power supply 13, which is a battery. The PSA system generates 0.5 to 3 LPM of oxygen-rich gas and delivers the gas to the patient via cannula 57. Gas pump 9 and primary drive motor 11 operate to provide sufficient pressurized air feed to the PSA system and withdraw sufficient waste gas from the PSA system so that the system can generate the required range of 0.5 to 3 LPM of oxygen-rich gas product. During portable operation of portable air separation device 7, stationary base unit 5 is on standby and charges spare rechargeable battery 65.

The battery of rechargeable power supply 13, when fully charged, will operate the portable system at a production rate of 3 LPM for at least 60 minutes. If the patient anticipates requiring portable operation longer than the fully charged operating life of the battery in power supply 13, several options are possible in this embodiment as well as the following embodiments. In a first option, fully charged spare battery 65 is taken to replace depleted battery 13 when discharged. In a second option, conductor 27 is taken and connected to an external DC power source such as the power outlet in an automobile, and connector 25 then is joined with connector 23 to provide DC power via conductors 21 and 19. In a third option, the patient takes an optional AC-DC converter (not shown) and connects to an alternative AC power source to provide DC power via conductor 27, connectors 23 and 35, and conductors 19 and 21.

In coupled operation in this embodiment, portable air separation device 7 and stationary base unit 5 are coupled by flow couplings 61 and 79, shaft coupling 77 and shaft connector 12, and connectors 31 and 75. During coupled operation, stationary base unit 5 and portable oxygen generator unit 3 are coupled and operated in tandem to supply 0.5 to 5 LPM of oxygen-rich product gas to a non-ambulatory patient located adjacent the tandem unit. In this mode, shaft coupling 77 is coupled with shaft connector 12 so that booster motor 67 operates in tandem with primary drive motor 11 to provide additional power to operate gas pump 9 at higher capacity. Flow coupling 79 is coupled with oxygen-rich gas outlet flow coupling 61 and deliver this gas to optional humidifier 69. Oxygen-rich product gas discharge port or flow coupling 81 is coupled with flow coupling 83 and oxygen-rich product gas is delivered to the patient via cannula 85. While operating in this tandem mode, the battery of rechargeable power supply 13 is recharged by power supply system 63 via connectors 31 and 75, conductor 29, and conductor 21. The battery of spare power supply system 65 is placed in receptacle 71 and recharged via conductor 73 during this time as needed.

Exemplary Embodiment 1A

This embodiment is identical to Embodiment 1 except for the method of driving gas pump 9 in the coupled mode. In the present embodiment, all power to drive gas pump 9 in the coupled mode is supplied by motor 67 via shaft coupling 77 and shaft connector 12. Motor 67 is a larger motor than that used as the booster motor in Embodiment 1 described above. Primary drive motor 11 is idle in this alternative version, and therefore the service life of this motor is increased because the motor is operated only in the portable mode. Motor 67 thus is sized to drive gas pump 9 so that the PSA system in portable air separation device 7 can generate 0.5 to 5 LPM of oxygen-rich product gas.

Exemplary Embodiment 2

This embodiment uses the system of FIG. 2 as described above. In this embodiment, portable air separation device 7 is a PSA system sized to deliver 0.5 to 5 LPM of oxygen-rich gas product with a purity of at least 80 mole % oxygen. Gas pump 202 is designed to provide sufficient pressurized air feed to the PSA system and withdraw sufficient waste gas from the PSA system so that the system can generate 0.5 to 3 LPM of oxygen-rich gas product. Gas pump 202 therefore is smaller than gas pump 9 of Embodiment 1. Gas pump primary drive motor 201 is designed in the present embodiment to drive gas pump 202 to provide sufficient air to the portable air separation device to generate 0.5 to 3 LPM of oxygen-rich gas.

Drive motor 203 and supplemental gas pump 205 are disposed in stationary base unit 5 and are sized to provide sufficient air to the portable air separation device to generate 0 to 2 LPM of oxygen-rich gas.

In this exemplary embodiment, portable oxygen generator unit 3 operates in the uncoupled mode as described for Embodiment 1 above. In the coupled mode, the coupled systems operate so that all feed gas to and all waste gas from the PSA system of air separation device 7 is provided by gas pump 202 in combination with gas pump 205. In the present embodiment, therefore, gas pump 202 is smaller than gas pump 9 of Embodiment 1, thereby reducing the weight of portable oxygen generator unit 3. When operating in the coupled mode, the system provides 0.5 to 5 LPM of oxygen-rich gas product via cannula 85. Other aspects of the operation in the coupled mode in the present embodiment are identical to those of Embodiment 1.

Exemplary Embodiment 2A

In this embodiment, all feed air in the coupled operating mode is supplied to air separation device 7 by gas pump 205 via lines 209 and 215, and all waste gas is withdrawn from air separation device 7 via lines 217 and 223 by gas pump 205. In this embodiment, the capacity of gas pump 205 and the output of drive motor 203 are increased compared with Embodiment 2 described above, and provide for a production rate of 0.5 to 5 LPM from the PSA system of air separation device 7. Primary drive motor 201 and gas pump 202 are not operated in the coupled mode of the present embodiment, and therefore the service lives of this motor and pump are increased because they are operated only in the uncoupled or portable mode. All other design and operating aspects of the present embodiment are identical to those of Embodiment 2 described above.

Exemplary Embodiment 3

This embodiment uses the system of FIG. 3 as described above. In this embodiment, both portable oxygen generator unit 3 and stationary base unit 5 have complete air separation systems which can operate in tandem in the coupled mode and independently in the uncoupled mode. In this embodiment, portable air separation device 301 is sized to generate 0.5 to 3 LPM of oxygen-rich gas, primary gas pump 303 is sized to provide sufficient air for the portable air separation device to generate 0.5 to 3 LPM of oxygen-rich gas, and primary drive motor 309 is sized to drive the primary gas pump to provide sufficient air to the portable air separation device to generate 0.5 to 3 LPM of oxygen-rich gas. Secondary gas pump 323 is sized to provide sufficient air to stationary air separation device 319 to generate 0-7 LPM of oxygen-rich gas, and stationary drive motor 329 is sized to drive the secondary gas pump to provide sufficient air to stationary air separation device 319 to generate 0-7 LPM of oxygen-rich gas.

In the uncoupled mode, portable oxygen generator unit 3 operates as described above for Embodiments 1 and 2, generating 0.5 to 3 LPM of oxygen-rich gas and supplying this gas to the patient via cannula 355. In the uncoupled mode, stationary base unit 5 may be operated to generate 0 to 7 LPM of oxygen-rich gas and supply this gas to the patient via cannula 353. This would be advantageous if portable oxygen generator unit 3 were out of service for maintenance or repair.

In the coupled mode, portable oxygen generator unit 3 and stationary base unit 5 are operated in tandem to generate 0-10 LPM of oxygen-rich gas and supply this gas to the patient via cannula 353. The present embodiment minimizes the weight of portable oxygen generator unit 3 compared with that of Embodiments 1, 1A, 2, and 2A described above because air separation device 301 may be sized to provide only the required amount of oxygen-enriched product gas from portable oxygen generator unit 3 operating in the uncoupled mode, and need not be sized to provide additional product in the coupled mode. The type of gas pump 319 in the stationary base unit can be different than the type of gas pump 303 of the portable unit used in the portable generator, since low weight, low volume, and power efficiency are less critical for the base unit than the portable unit. The PSA system and process of the base unit also may be different from that of the portable unit, again since low weight, low volume, and power efficiency are less critical for the base unit than the portable unit.

Alternatives to the Exemplary Embodiments described above are possible regarding the flow of oxygen-rich gas product to the patient when portable oxygen generator unit 3 and stationary base unit 5 are operated in the coupled mode. In all of these alternative embodiments, humidified oxygen from stationary base unit 5 flows to portable oxygen generator unit 3 and is delivered to the patient via the cannula coupled to portable oxygen generator unit 3 for both the coupled mode and the uncoupled mode of operation of oxygen generator unit 3 and stationary base unit 5.

In the alternative embodiments to Exemplary Embodiments 1 and 1A, referring to FIG. 1, the flow of humidified oxygen-rich gas from humidifier 69 is returned to portable oxygen generator unit 3 via flow couplings (not shown) and a line (not shown) that connects with line 51. Flow coupling 81, flow coupling 83, and cannula 85 are not used in these alternative embodiments. The humidified oxygen-rich gas passes through coupled flow couplings 53 and 55 and through cannula 57 to the patient.

In the alternatives to Exemplary Embodiments 2 and 2A, referring to FIG. 2, the flow of humidified oxygen-rich gas from humidifier 225 is returned to portable oxygen generator unit 3 via flow couplings (not shown) and a line (not shown) that connects with line 51. Flow coupling 81, flow coupling 83, and cannula 85 are not used in these alternative embodiments. The humidified oxygen-rich gas passes through coupled flow couplings 53 and 55 and through cannula 57 to the patient.

In the alternative to Exemplary Embodiment 3, referring to FIG. 3, the flow of humidified oxygen-rich gas from humidifier 347 is returned to portable oxygen generator unit 3 via flow couplings (not shown) and a line (not shown) that connects with line 348. Flow coupling 350, flow coupling 351, and cannula 353 are not used in these alternative embodiments. The humidified oxygen-rich gas passes through coupled flow couplings 352 and 354 and through cannula 355 to the patient.

Exemplary Embodiment 2 above is illustrated in the following Examples by two process simulations of the process system of FIG. 2. The Examples do not limit the invention to any of the specific details described therein.

EXAMPLE 1

The independent operation of portable oxygen generator unit 3 of FIG. 2 was simulated using SIMPAC gas adsorption process simulation software based on descriptions given by D. G. Hartzog and S. Sircar in *Adsorption*, Vol. 1, pp. 133-151 (1995) and S. Sircar et al in *Separation and Purification Technology*, Vol. 17(1), pp. 11-20 (1999). Air separation device 7 is a 5 bed PSA system operated with a 0.753 ACFM (actual cubic feet per minute) compressor and a 1.088 ACFM vacuum pump. The cycle time is 10 seconds and the pressure envelope is 0.514 atma to 1.5138 atma for a pressure ratio of 2.94. Each absorber bed is 53 mm in diameter and 87 mm in height. The bed contains a layer of NaX zeolite 26 mm deep at the feed end for water removal followed by a layer 61 mm deep of a highly lithium-exchanged, low-silica, X-type zeolite for air separation. The system produces 3.28 LPM of oxygen-rich gas at 93% oxygen purity.

The cycle steps used in the simulated process are described in Table 2 below.

TABLE 2

Process Cycle Steps for Example 1

| Step Number | Description | Duration, Sec. |
|---|---|---|
| 1 | Feed/make product/provide purge | 1.0 |
| 2 | Feed/make product/provide repress. gas | 1.0 |
| 3 | provide 1st repressurization gas | 1.0 |
| 4 | provide 2nd repressurization gas | 1.0 |
| 5 | Idle step | 1.0 |
| 6 | Evacuation | 1.0 |
| 7 | Purge with product gas | 1.0 |

TABLE 2-continued

Process Cycle Steps for Example 1

| Step Number | Description | Duration, Sec. |
|---|---|---|
| 8 | Receive 2nd repressurization gas | 1.0 |
| 9 | Receive 1st repressurization gas | 1.0 |
| 10 | Repressurize with product gas | 1.0 |

During the initial portion of Step 1, the feed step, there is a short period of feed pressurization before product gas flows from the bed.

A cycle chart is given in Table 3 to show the relationship of cycle steps among the five adsorbent beds.

TABLE 2

Cycle Chart for Example 1

| Bed | Step Number | | | | | | | | | |
|---|---|---|---|---|---|---|---|---|---|---|
| 1 | 1 | 2 | 3 | 4 | 5 | 6 | 7 | 8 | 9 | 10 |
| 2 | 9 | 10 | 1 | 2 | 3 | 4 | 5 | 6 | 7 | 8 |
| 3 | 7 | 8 | 9 | 10 | 1 | 2 | 3 | 4 | 5 | 6 |
| 4 | 5 | 6 | 7 | 8 | 9 | 10 | 1 | 2 | 3 | 4 |
| 5 | 3 | 4 | 5 | 6 | 7 | 8 | 9 | 10 | 1 | 2 |

EXAMPLE 2

The coupled operation of portable oxygen generator unit 3 and stationary base unit 5 was simulated again using the same PSA system and 10 second cycle of Example 1. In the operation of both gas pumps 202 and 205 in the coupled mode, the combined compression capacity is 1.243 ACFM and the combined vacuum pump capacity is 1.795 ACFM. The pressure envelope is 0.474 atma to 2.297 atma for a pressure ratio of 4.85. This coupled mode of operation produces 5.81 LPM of total product at 93% oxygen purity.

The invention claimed is:

1. An oxygen generation system comprising
    (a) a portable oxygen generator unit comprising a portable air separation device for the generation of an oxygen-rich gas, a primary gas pump including means to supply air to the portable air separation device, a primary motor to drive the gas pump, a rechargeable power supply to drive the motor, connector means adapted to deliver power to the rechargeable power supply, flow coupling means to transfer the oxygen-rich gas from the portable oxygen generator unit, and a first oxygen-rich gas product discharge port; and
    (b) a stationary base unit adapted to couple with the portable oxygen generator unit, wherein the stationary base unit comprises a stationary power supply system including connector means adapted to recharge the rechargeable power supply in the portable oxygen generator unit, flow coupling means to receive the oxygen-rich gas from the portable oxygen generator unit, and a second oxygen-rich gas product discharge port.

2. The system of claim 1 wherein the portable oxygen generator unit is capable of operating independently in an uncoupled mode and supplying the oxygen-rich gas product at a first flow rate to a user via a cannula attached to the first discharge port.

3. The system of claim 2 wherein the portable oxygen generator unit further comprises a conserver adapted to regulate the flow of oxygen-rich gas product supplied to the user by the cannula attached to the first discharge port.

4. The system of claim 1 wherein the portable oxygen generator unit and the stationary base unit are capable of operating in tandem in a coupled mode and supplying the oxygen-rich gas product at a second flow rate to a user via a cannula attached to the second discharge port, and wherein the second flow rate is greater than the first flow rate.

5. The system of claim 4 wherein the stationary base unit further comprises a conserver adapted to regulate the flow of oxygen-rich gas product supplied to the user by the cannula attached to the second discharge port.

6. The system of claim 1 wherein the primary gas pump further includes means to withdraw gas from the portable air separation device.

7. The system of claim 6 wherein the primary gas pump includes a feed gas compressor and a waste gas compressor, both of which are driven by the primary motor.

8. The system of claim 1 wherein the stationary base unit includes a booster motor and a first drive coupling means integrated with the booster motor, the portable oxygen generator unit includes a second drive coupling means integrated with the primary motor, and the booster motor and primary motor are adapted to operate in tandem and drive the primary gas pump when the stationary base unit is coupled with the portable oxygen generator unit.

9. The system of claim 8 wherein the portable air separation device is sized to generate 0.5 to 5 LPM of oxygen-rich gas, the primary gas pump is sized to provide sufficient air for the portable air separation device to generate 0.5 to 5 LPM of oxygen-rich gas, the primary motor is sized to drive the primary gas pump to provide sufficient air to the portable air separation device to generate 0.5 to 3 LPM of oxygen-rich gas, and the booster motor is sized so that together with the primary motor, the booster motor is able to drive the primary gas pump to provide sufficient air to the portable air separation device to generate 3 to 5 LPM of oxygen-rich gas.

10. The system of claim 8 wherein the primary gas pump includes means to withdraw gas from the portable air separation device.

11. The system of claim 1 wherein the stationary base unit includes a stationary drive motor and a first drive coupling means integrated with the stationary drive motor, the portable oxygen generator unit includes a second drive coupling means integrated with the primary gas pump, and the stationary drive motor is adapted to drive the primary gas pump when the stationary base unit is coupled with the portable oxygen generator unit.

12. The system of claim 11 wherein the portable air separation device is sized to generate 0.5 to 5 LPM of oxygen-rich gas, the primary gas pump is sized to provide sufficient air for the portable air separation device to generate 0.5 to 5 LPM of oxygen-rich gas, the primary motor is sized to drive the primary gas pump to provide sufficient air to the portable air separation device to generate 0.5 to 3 LPM of oxygen-rich gas, and the stationary drive motor is sized to drive the primary gas pump to provide sufficient air to the portable air separation device to generate 0.5 to 5 LPM of oxygen-rich gas.

13. The system of claim 9 wherein the primary gas pump includes means to withdraw gas from the portable air separation device.

14. The system of claim 1 wherein the stationary base unit includes a secondary gas pump, a stationary drive motor to drive the secondary gas pump, and a gas export line from the secondary gas pump; wherein the portable oxygen generator unit includes a gas import line in flow communication with the portable air separation device; and wherein the gas export line and gas import line each have flow coupling means that can be coupled such that the secondary gas pump can provide a portion of the air to the portable air separation device when the stationary base unit is coupled with the portable oxygen generator unit.

15. The system of claim 14 wherein the portable air separation device is sized to generate 0.0.5 to 5 LPM of oxygen-rich gas, the primary gas pump is sized to provide sufficient air for the portable air separation device to generate 0.5 to 3 LPM of oxygen-rich gas, the primary motor is sized to drive the primary gas pump to provide sufficient air to the portable air separation device to generate 0.5 to 3 LPM of oxygen-rich gas, the secondary gas pump is sized so that in tandem with the primary gas pump the two pumps can provide sufficient air to the portable air separation device to generate up to 5 LPM of oxygen-rich gas, and the stationary drive motor is sized to drive the secondary gas pump so that in tandem with the primary gas pump the two pumps can provide sufficient air to the portable air separation device to generate up to 5 LPM of oxygen-rich gas.

16. The system of claim 14 wherein the primary gas pump includes means to withdraw gas from the portable air separation device and the secondary gas pump includes means to withdraw gas from the portable air separation device.

17. The system of claim 1 wherein the stationary base unit includes a secondary gas pump, a stationary drive motor to drive the secondary gas pump, and a gas export line from the secondary gas pump; wherein the portable oxygen generator unit includes a gas import line in flow communication with the portable air separation device; and wherein the gas export line and gas import line each have flow coupling means that can be coupled such that the secondary gas pump can provide all of the air to the portable air separation device when the stationary base unit is coupled with the portable oxygen generator unit.

18. The system of claim 17 wherein the portable air separation device is sized to generate 0.5 to 5 LPM of oxygen-rich gas, the primary gas pump is sized to provide sufficient air for the portable air separation device to generate 0.5 to 3 LPM of oxygen-rich gas, the primary motor is sized to drive the primary gas pump to provide sufficient air to the portable air separation device to generate 0.5 to 3 LPM of oxygen-rich gas, the secondary gas pump is sized to provide sufficient air to the portable air separation device to generate 0.5 to 5 LPM of oxygen-rich gas, and the stationary drive motor is sized to drive the secondary gas pump to provide sufficient air to the portable air separation device to generate 0.5 to 5 LPM of oxygen-rich gas.

19. The system of claim 17 wherein the primary gas pump includes means to withdraw gas from the portable air separation device and the secondary gas pump includes means to withdraw gas from the portable air separation device.

20. The system of claim 1 wherein the stationary base unit includes a stationary air separation device for the generation of a supplemental oxygen-enriched gas, a stationary gas pump including means to supply air to the stationary air separation device, a motor to drive the stationary gas pump, and piping means to combine the supplemental oxygen-rich gas with the oxygen-rich gas from the portable oxygen generator unit when the stationary base unit is coupled with the portable oxygen generator unit.

21. The system of claim 20 wherein the portable air separation device is sized to generate 0.5 to 3 LPM of oxygen-rich gas, the primary gas pump is sized to provide sufficient air for the portable air separation device to generate 0.5 to 3 LPM of oxygen-rich gas, the primary motor is sized to drive the primary gas pump to provide sufficient air to the portable air separation device to generate 0.5 to 3 LPM of oxygen-rich gas, the secondary gas pump is sized to provide sufficient air to the stationary air separation device to generate 0 to 7 LPM of oxygen-rich gas, and the stationary drive motor is sized to drive the secondary gas pump to provide sufficient air to the stationary air separation device to generate 0 to 7 LPM of oxygen-rich gas.

22. The system of claim 20 wherein the primary gas pump includes means to withdraw gas from the portable air separation device and the secondary gas pump includes means to withdraw gas from the stationary air separation device.

23. The system of claim 20 wherein the stationary air separation device comprises a pressure swing adsorption system.

24. The system of claim 1 wherein the portable oxygen generator unit further comprises a product storage tank for the oxygen-rich gas product.

25. The system of claim 1 wherein the portable air separation device comprises a pressure swing adsorption system.

26. The system of claim 1 wherein the stationary base unit further comprises a humidifier adapted to add moisture to the oxygen-rich gas product.

27. The system of claim 1 wherein the stationary base unit further comprises a spare rechargeable power supply and means to recharge the spare rechargeable power supply.

28. The system of claim 1 wherein the rechargeable power supply is a rechargeable battery.

29. The system of claim 28 wherein the stationary power supply system comprises an AC to DC power converter and a DC battery charger adapted to recharge the rechargeable battery.

30. The system of claim 1 wherein the portable air separation device further comprises a power connector to receive DC power from an external source.

31. The system of claim 1 wherein the rechargeable power supply is a portable fuel cell system comprising a fuel cell and portable fuel storage means.

32. The system of claim 31 wherein the fuel is hydrogen or methanol.

33. The system of claim 31 wherein the stationary power supply system comprises a stationary fuel cell system, stationary fuel storage means, and piping and connector means to transfer fuel to the portable fuel storage means when the stationary base unit is coupled with the portable oxygen generator unit.

34. The system of claim 33 wherein the fuel is hydrogen or methanol.

35. A method to generate an oxygen-rich gas product comprising
(a) providing a portable oxygen generator unit comprising a portable air separation device for the generation of an oxygen-rich gas, a primary gas pump including means to supply air to the portable air separation device, a primary motor to drive the gas pump, a rechargeable power supply to drive the motor, connector means adapted to receive power to recharge the rechargeable power supply in the portable oxygen generator unit, flow coupling means to transfer the oxygen-rich gas from the portable oxygen generator unit, and a first oxygen-rich gas product discharge port;

(b) providing a stationary base unit adapted to couple with the portable oxygen generator unit, wherein the stationary base unit comprises a stationary power supply system including connector means adapted to supply power to recharge the rechargeable power supply in the portable oxygen generator unit, flow coupling means to receive oxygen-rich gas from the portable oxygen generator unit, and a second oxygen-rich gas product discharge port;

(c) operating the portable oxygen generator unit and the stationary base unit in an uncoupled mode wherein the portable oxygen generator unit is operated to separate air and provide the oxygen-rich gas product at a first flow rate to a user via a cannula attached to the first discharge port; and (d) operating the portable oxygen generator unit and the stationary base unit in a coupled mode by
(1) coupling the portable oxygen generator unit and the stationary base unit by connecting the connector means and coupling the flow coupling means; and
(2) operating the portable oxygen generator unit to separate air and provide the oxygen-rich gas, transferring the oxygen-rich gas to the stationary base unit, and supplying the oxygen-rich gas product at a second flow rate to a user via a cannula attached to the second discharge port, and wherein the second flow rate is greater than the first flow rate.

36. The method of claim 35 wherein the portable oxygen generator unit is operated in the uncoupled mode and generates the oxygen-rich gas product at a flow rate in the range of 0.5 to 3 LPM.

37. The method of claim 35 wherein the portable oxygen generator unit and the stationary base unit are operated in the coupled mode and the coupled system generates the oxygen-rich gas product at a flow rate in the range of 0.5 to 5 LPM.

38. The method of claim 35 wherein the stationary base unit includes a booster motor and a first drive coupling means integrated with the booster motor, the portable oxygen generator unit includes a second drive coupling means integrated with the primary motor, and the booster motor and primary motor are adapted to operate in tandem and drive the primary gas pump when the stationary base unit is coupled with the portable oxygen generator unit; and wherein the stationary base unit is coupled with the portable oxygen generator unit and the booster motor and primary motor are operated in tandem to drive the primary gas pump and provide air to the portable air separation device.

39. The method of claim 35 wherein the stationary base unit includes a stationary drive motor and a first drive coupling means integrated with the stationary drive motor, the portable oxygen generator unit includes a second drive coupling means integrated with the primary gas pump, and the stationary drive motor is adapted to drive the primary gas pump when the stationary base unit is coupled with the portable oxygen generator unit, and wherein the primary gas pump is driven only by the stationary drive motor to provide the air to the portable air separation device.

40. The method of claim 35 wherein the stationary base unit includes a secondary gas pump, a stationary drive motor to drive the secondary gas pump, and a gas export line from the secondary gas pump, the portable oxygen generator unit includes a gas import line in flow communication with the portable air separation device, and the gas export line and gas import line each have flow coupling means that can be connected such that the secondary gas pump can provide a portion of the air to the portable air separation device when the stationary base unit is coupled with the portable oxygen generator unit;

and wherein the stationary base unit is coupled with the portable oxygen generator unit and the primary and secondary gas pumps are operated together to provide the air to the portable air separation device.

41. The method of claim 35 wherein the stationary base unit includes a secondary gas pump, a stationary drive motor to drive the secondary gas pump, and a gas export line from the secondary gas pump, the portable oxygen generator unit includes a gas import line in flow communication with the portable air separation device, and the gas export line and gas import line each have flow coupling means that can be coupled such that the secondary gas pump can provide all of the air to the portable air separation device when the stationary base unit is coupled with the portable oxygen generator unit; and wherein the stationary base unit is coupled with the portable oxygen generator unit and the secondary gas pump is operated to provide all of the air to the portable air separation device.

42. The method of claim 35 wherein the stationary base unit includes a stationary air separation device for the generation of a supplemental oxygen-enriched gas, a stationary gas pump including means to supply air to the stationary air separation device, a motor to drive the stationary gas pump, and piping means to combine the supplemental oxygen-rich gas with the oxygen-rich gas from the portable oxygen generator unit when the stationary base unit is coupled with the portable oxygen generator unit; and wherein the stationary base unit is coupled with the portable oxygen generator unit, and the oxygen-enriched gas and the supplemental oxygen-enriched gas are combined to provide the oxygen-rich gas product to the second cannula.

43. The method of claim 35 wherein the oxygen-rich product gas contains greater than 85 mole % oxygen.

44. The method of claim 35 wherein the primary motor is driven by externally-provided DC power when the portable oxygen generation unit is operated in the uncoupled mode.

45. An oxygen generation system comprising
(a) a portable oxygen generator unit comprising a portable air separation device for the generation of oxygen-rich gas, a primary gas pump including means to supply air to the portable air separation device, a primary motor to drive the gas pump, a rechargeable power supply to drive the motor, connector means adapted to deliver power to the rechargeable power supply, and an oxygen-rich gas product discharge port, wherein the portable oxygen generation unit is adapted to operate in a portable mode and generate a first flow rate of oxygen-rich gas; and
(b) a stationary base unit adapted to couple with the portable oxygen generator unit, wherein the stationary base unit comprises a stationary power supply system including connector means adapted to recharge the rechargeable power supply in the portable oxygen generator unit;
wherein the portable oxygen generator unit and the stationary base unit each include a first flow coupling means adapted to transfer oxygen-rich gas from the portable oxygen generator unit to the stationary base unit and a second flow coupling means adapted to transfer oxygen-rich gas from the stationary base unit to the portable oxygen generator unit, and wherein the stationary base unit and the portable oxygen generator unit are adapted to operate together in a coupled mode to generate oxygen-rich gas at a second flow rate that is greater than the first flow rate.

46. The system of claim 45 wherein the portable oxygen generator unit is adapted to supply oxygen-rich gas product to a user via a cannula attached to the product discharge port.

47. The system of claim 45 wherein the stationary base unit further comprises a humidifier adapted to add moisture to the oxygen-rich gas product.

48. The system of claim 47 wherein the stationary base unit is coupled with the portable oxygen generator unit and wherein the stationary base unit and the portable oxygen generator unit are adapted to provide humidified oxygen-rich product gas to a user via a cannula attached to the product discharge port on the portable oxygen generator unit.

49. A method to generate an oxygen-rich gas product comprising
(a) providing a portable oxygen generator unit comprising a portable air separation device for the generation of oxygen-rich gas, a primary gas pump including means to supply air to the portable air separation device, a primary motor to drive the gas pump, a rechargeable power supply to drive the motor, connector means adapted to receive power to recharge the rechargeable power supply, and an oxygen-rich gas product discharge port;
(b) providing a stationary base unit adapted to couple with the portable oxygen generator unit, wherein the stationary base unit comprises a stationary power supply system including connector means adapted to recharge the rechargeable power supply in the portable oxygen generator unit and means to humidify oxygen-rich gas, and wherein the portable oxygen generator unit and the stationary base unit each include first coupling means adapted to transfer oxygen-rich gas from the portable oxygen generator unit to the stationary base unit and second coupling means adapted to transfer oxygen-rich gas from the stationary base unit to the portable oxygen generator unit;
(c) operating the portable oxygen generator unit and the stationary base unit in an uncoupled mode wherein the portable oxygen generator unit is operated to separate air and provide an oxygen-rich gas product gas at a first flow rate of oxygen-rich gas to a user via a cannula attached to the product discharge port; and
(d) operating the portable oxygen generator unit and the stationary base unit in a coupled mode by
  (1) coupling the portable oxygen generator unit and the stationary base unit by connecting the connector means and coupling the first and second coupling means; and
  (2) operating the portable oxygen generator unit to separate air and provide an oxygen-rich gas, transferring the oxygen-rich gas to the stationary base unit, humidifying the oxygen-rich gas to provide a humidified oxygen-rich gas, transferring the humidified oxygen-rich gas to the portable oxygen generator unit, and supplying a humidified oxygen-rich gas product at a second flow rate of oxygen-rich gas to a user via the cannula attached to the discharge port on the portable oxygen generator unit, wherein the second flow rate is greater than the first flow rate.

* * * * *

UNITED STATES PATENT AND TRADEMARK OFFICE
CERTIFICATE OF CORRECTION

| | |
|---|---|
| PATENT NO. | : 7,273,051 B2 |
| APPLICATION NO. | : 10/762785 |
| DATED | : September 25, 2007 |
| INVENTOR(S) | : Roger Dean Whitley, Glenn Paul Wagner and Matthew James LaBuda |

It is certified that error appears in the above-identified patent and that said Letters Patent is hereby corrected as shown below:

Column 22, Line 9

In claim 15 delete the word "0.0.5" and insert -- 0.5 --

Signed and Sealed this

Fourth Day of December, 2007

JON W. DUDAS
*Director of the United States Patent and Trademark Office*